United States Patent [19]
Noda et al.

[11] Patent Number: 5,906,899
[45] Date of Patent: *May 25, 1999

[54] SEALED STORAGE BATTERY HAVING ELECTRODE PLATE FOOT WHICH RESTS ON A RIB AND COVER JOINT STRUCTURE WITH HIGH ADHESIVE STRENGTH

[75] Inventors: Muneyoshi Noda, Toyohashi; Yasuhiko Uchida, Fujisawa; Yukihiro Onoda, Chigasaki; Hiroshi Sugiyama, Naka-gun, all of Japan

[73] Assignee: Matsushita Electric Industrial Co., Ltd., Osaka-Fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,356

[22] Filed: Dec. 9, 1996

[30] Foreign Application Priority Data

| Feb. 8, 1996 | [JP] | Japan | 8-022650 |
| Mar. 5, 1996 | [JP] | Japan | 8-047404 |
| Mar. 14, 1996 | [JP] | Japan | 8-057767 |
| Mar. 14, 1996 | [JP] | Japan | 8-057769 |

[51] Int. Cl.⁶ .......................... H01M 6/42; H01M 6/46; H01M 4/56
[52] U.S. Cl. .................. 429/149; 429/225; 429/152; 429/153; 429/154
[58] Field of Search ................ 429/158, 160, 429/161, 181–186, 123

[56] References Cited

U.S. PATENT DOCUMENTS

| 2,481,558 | 9/1949 | Appel | 429/161 |
| 3,113,892 | 12/1963 | Albrecht | 429/182 |
| 3,494,798 | 2/1970 | Teeter et al. . | |
| 3,546,023 | 12/1970 | Halter et al. . | |
| 3,836,401 | 9/1974 | Niklas et al. | 429/158 X |
| 4,041,212 | 8/1977 | Hewitt . | |
| 4,054,990 | 10/1977 | Borjeson | 429/186 X |
| 4,224,383 | 9/1980 | Taylor | 429/7 |
| 4,383,011 | 5/1983 | McClelland | 429/160 X |
| 4,425,414 | 1/1984 | Solomon | 429/179 |
| 4,724,190 | 2/1988 | Siga et al. | 429/158 |

FOREIGN PATENT DOCUMENTS

| A 0 220 062 | 4/1987 | European Pat. Off. . |
| A-1-339-493 | 12/1973 | United Kingdom . |
| WO 83/03925 | 11/1983 | WIPO . |

OTHER PUBLICATIONS

M. Iwata, "Large Capacity Sealed Lead–Acid Battery For Stationary Use," *Progress in Batteries & Solar Cells*, vol. 8, pp. 231–234 (1989) No Month.

*Primary Examiner*—Maria Nuzzolillo
*Assistant Examiner*—Jennifer O'Malley
*Attorney, Agent, or Firm*—Panitch Schwarze Jacobs & Nadel, P.C.

[57] ABSTRACT

A sealed lead acid storage battery includes a monoblock container, a cover, plural assembly elements, each assembly element comprising a plurality of positive and negative electrode plates that are stacked via separators in a predetermined direction, a positive and negative electrode strap, and a positive and negative electrode terminal. The positive and negative electrode terminals protrude above the cover. The container further comprises ribs formed inside a bottom surface thereof for enabling the electrode plates to rest on the ribs. Each positive electrode plate has a pair of feet that are formed on a lower end thereof in a substantially symmetrical arrangement and further comprises a lug connected to the positive electrode strap that is disposed at a position shifting either to the left or to the right. One of the feet correspond to the position having the lug not resting on any rib, while the other foot rests on a rib. The storage battery further comprises a projection formed on an end face of the opening of one of the container and the cover and a recess formed in an end face of the opening of the other. The projection is fitted in the recess and bonded thereto via an adhesive. At least either an inner face of the recess or a surface of the projection has a plurality of vertical ribs for defining a space between the surface of the projection and the inner face of the recess.

5 Claims, 16 Drawing Sheets

SEALED STORAGE BATTERY HAVING ELECTRODE PLATE FOOT WHICH RESTS ON A RIB AND COVER JOINT STRUCTURE WITH HIGH ADHESIVE STRENGTH

BACKGROUND OF THE INVENTION

1. Field of the Invention

The present invention relates to a sealed storage battery. More specifically, the present invention pertains to a storage battery for stationary applications, such as a lead acid storage battery, which is composed of a large number of cells and used over a long time.

2. Description of the Prior Art

Sealed, stationary lead acid storage batteries have widely been applied to backup power sources for telephone switchboards and computers, power sources for emergency lighting in buildings, and power sources for equipment of receiving and distributing electricity and transforming stations. Since such power sources are required to have a high voltage and a large capacity, it is desirable that each storage battery has a high voltage and a large capacity. Increased dimensions of electrode plates worsen the efficiency of current collection and increase the deflection of the plates in use. In storage batteries used over a long time, increased number of stacked plates makes it rather difficult to manufacture a battery case or container having a desired mechanical strength that can maintain at a constant level the stacking pressure of the plates, which significantly affects the life of the battery and its performance.

A lead acid storage battery shown in FIG. 20 has conventionally been used for such applications. This lead acid storage battery includes a monoblock container, in which two cell rows, each including two cells, are arranged in parallel to each other. The monoblock container 80 includes a first cell row 81 having cells 81a and 81b and a second cell row 82 having cells 82a and 82b, which are arranged in parallel to each other. The monoblock container 80 is sealed with a one-piece cover. The respective cells are separated by intercell partitions disposed in the container and on the cover. Each cell has a positive electrode terminal and a negative electrode terminal provided on the upper surface of the cover. The negative electrode terminals of the cells 81a and 81b included in the first cell row 81 are connected by a connecting bar 83 embedded in a compound packed in a recess formed on the upper surface of the cover.

When these batteries are applied for a power source device, adjacent cells included in different cell rows are electrically connected in parallel in each battery, whereas the respective batteries are electrically connected in series. A power source device having a high voltage and a large capacity can be prepared by connecting a plurality of battery groups in series and/or in parallel, each battery group consisting of a plurality of batteries connected in series.

In the battery discussed above, the respective cells 81a, 81b, 82a and 82b are independent of one another. In case that the characteristics of the respective cells, especially, their capacities, are varied in use, an excess load is applied to a specific cell having the smallest capacity. This further shortens the life of the specific cell. Selection of adequate terminals is required to allow all the four cells included in one battery to participate in discharging. When a large number of batteries are connected with one another, special care is required to select the right terminals.

SUMMARY OF THE INVENTION

The object of the present invention is thus to provide a storage battery which has a less variation in characteristics of cell constituents and enables all the cells to be discharged when positive electrode terminals and negative electrode terminals of the cells are selected in any combination.

The present invention provides a sealed storage battery, which comprises a monoblock container, in which at least two cell rows, each cell row including a plurality of cells linked in one direction, are arranged adjacent to and in parallel to each other; a cover for sealing an opening of the monoblock container; first intercell connectors for electrically connecting adjacent cells included in each cell row in parallel; second intercell connectors for electrically connecting adjacent cells included in different cell rows in parallel; and positive electrode terminals and negative electrode terminals arranged on the cover corresponding to the respective cells.

The present invention is also directed to a sealed lead acid storage battery, which comprises (a) a monoblock container, in which at least two cell rows, each cell row including a plurality of cell compartments linked in a predetermined direction, are arranged adjacent to and in parallel to each other, each cell compartment being separated by partitions from adjacent cell compartments;

(b) a cover having second partitions that correspond to the first partitions of the monoblock container for separating the respective cell compartments, each partition for separating the cell compartments included in each cell row having an opening, the cover sealing an opening of the monoblock container;

(c) plural assembly elements, each assembly element comprising a plurality of positive electrode plates and negative electrode plates that are stacked via separators in the predetermined directions, along which the cells of each cell row are linked with one another, and accommodated in each cell compartment;

(d) a positive electrode strap and a negative electrode strap arranged above each assembly element to be protruded upward from the opening of the container, the positive electrode strap connecting positive electrode plates with each other and the negative electrode strap connecting negative electrode plates with each other;

(e) first intercell connectors for electrically connecting the straps with an identical polarity of adjacent cell compartments included in each cell row via the opening of each partition;

(f) a positive electrode terminal and a negative electrode terminal respectively connected to the positive electrode strap and the negative electrode strap of each cell compartment, the positive electrode terminal and the negative electrode terminal being protruded above the cover; and (g) second intercell connectors for electrically connecting adjacent cells included in different cell rows in parallel to each other on the cover.

In a preferred mode of the present invention, the first intercell connectors are arranged inside the cover and the second intercell connectors are arranged on the cover.

In a preferred mode of the present invention, the second intercell connectors are disposed in a recess formed in an upper surface of the cover and coated with an insulating compound.

In a preferred mode of the present invention, the adjacent cells in the each cell row have interconnecting gas phases.

In a preferred mode of the present invention, the adjacent cells in the each cell row are separated by partitions and the partition has an aperture formed on a bottom portion thereof for interconnecting the adjacent cells.

In a preferred mode of the present invention, the container comprises two cell rows and each cell row comprises two cells.

While the novel features of the invention are set forth particularly in the appended claims, the invention, both as to organization and content, will be better understood and appreciated, along with other objects and features thereof, from the following detailed description taken in conjunction with the drawings.

DETAINED DESCRIPTION OF THE PREFERRED EMBODIMENTS

The following describes preferred embodiments of the present invention.

Figure 1:
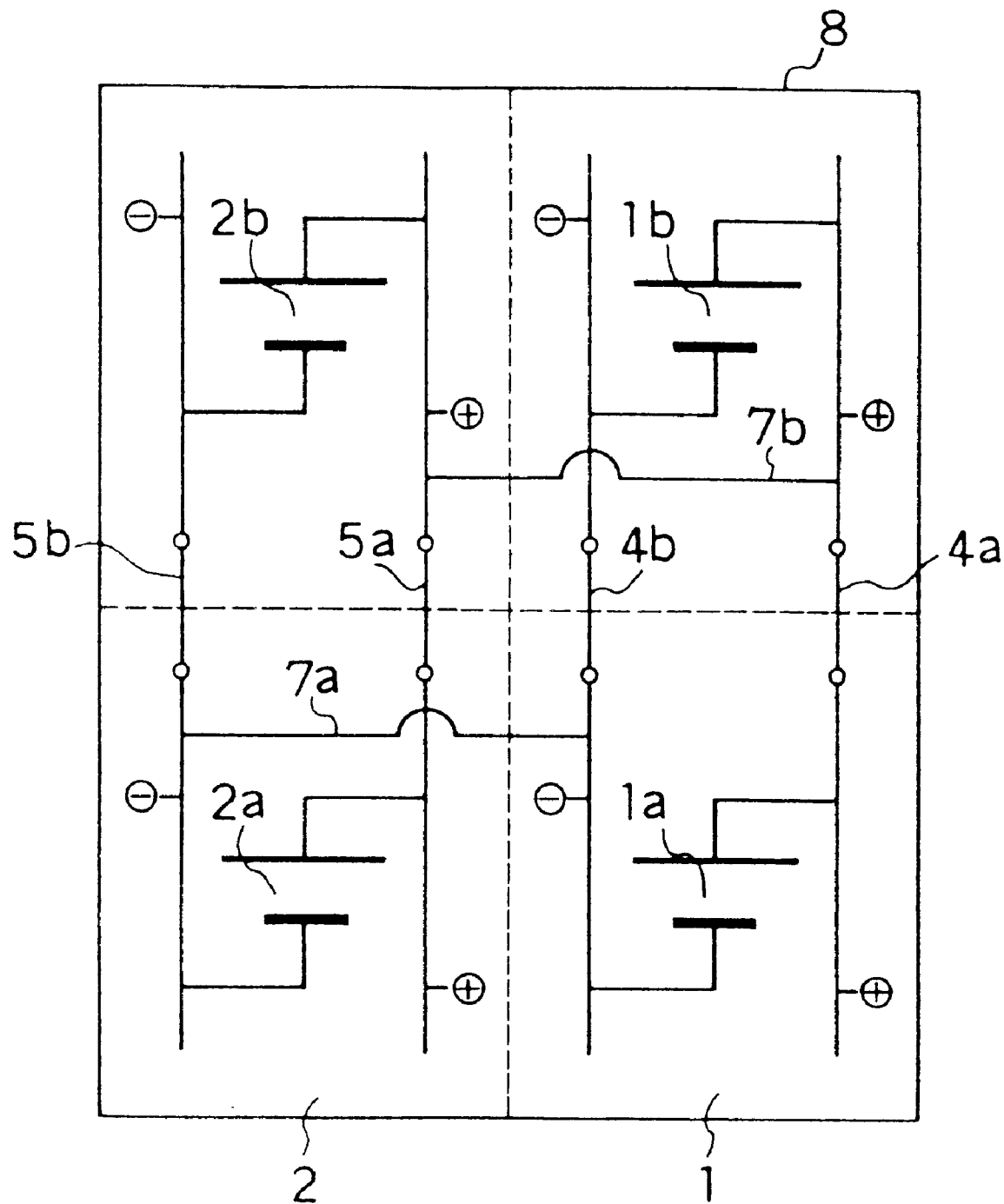
FIG. 1 shows an arrangement of cells and an electrical connection in a sealed storage battery embodying the present invention.

A sealed storage battery shown in FIG. 1 includes a monoblock container 8, in which a first cell row 1 having two cells 1a and 1b linked in a predetermined direction and a second cell row 2 having two cells 2a and 2b linked in the predetermined direction are arranged adjacent to and in parallel to each other. An opening of the container 8 is sealed with a one-piece cover (not shown). The adjacent cells included in each cell row are electrically connected in parallel to each other by means of first intercell connectors 4a and 4b or 5a and 5b, whereas the adjacent cells included in different cell rows are electrically connected in parallel to each other by means of second intercell connectors 7a and 7b. A positive electrode terminal and a negative electrode terminal are provided corresponding to each cell on the cover.

The storage battery thus constructed functions as a battery, in which the first cell row 1 having the cells 1a and 1b connected in parallel and the second cell row 2 having the cells 2a and 2b connected in parallel are arranged in parallel to each other, even when any positive electrode terminal is combined with any negative electrode terminal. Namely, this lead acid storage battery has a capacity four times as much as that of one cell at a voltage of 2V. The positive electrode terminals and the negative electrode terminals are equivalent in any cells. This increases the degree of freedom of connection when a large number of batteries are electrically connected in parallel and/or in series to constitute a power source device having a high voltage and a large capacity.

This structure enables any cells to evenly participate in discharging.

The above embodiment has a structure in which two cell rows, each including two cells, are arranged in parallel to each other.

Figure 2:
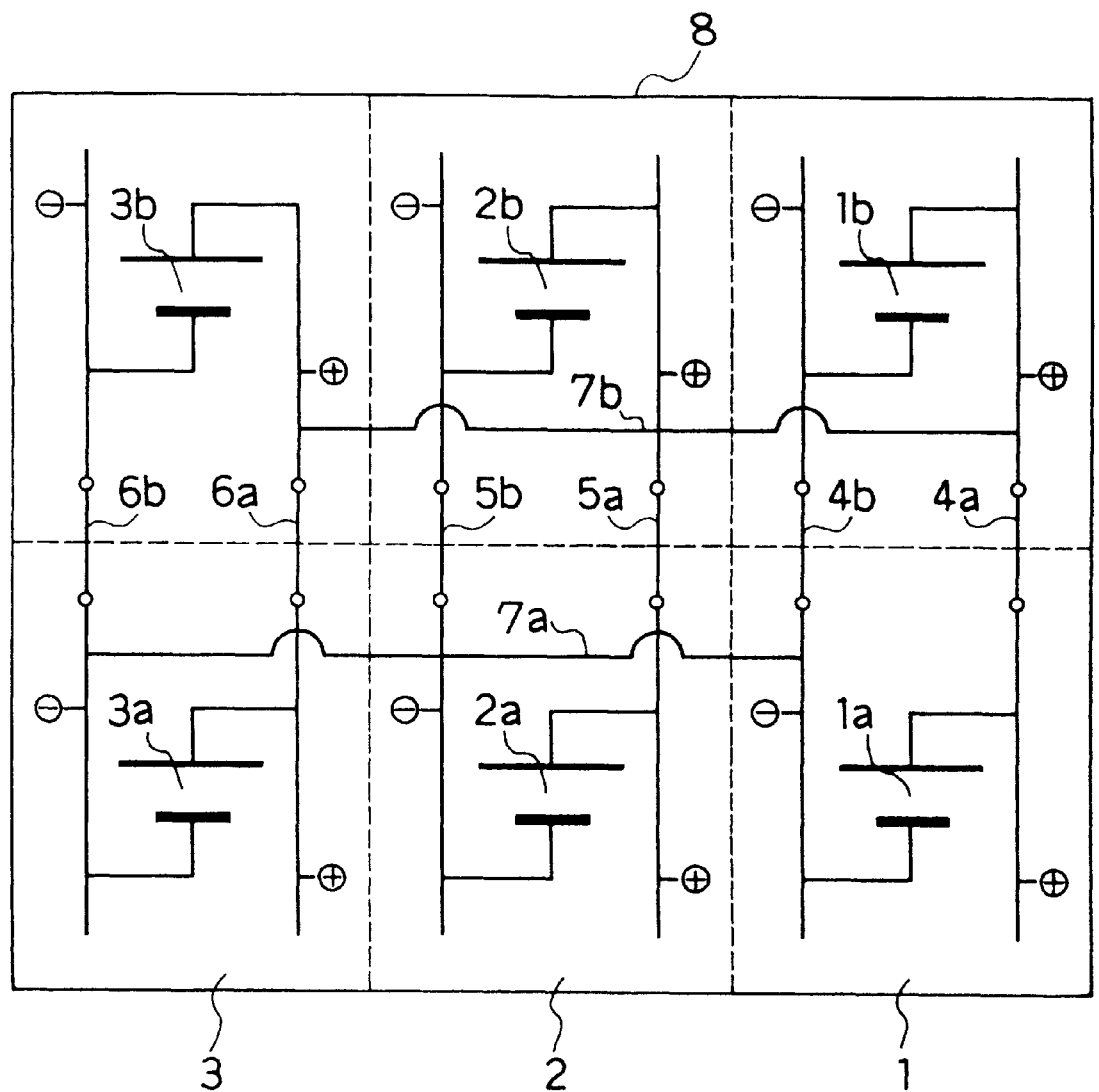
FIG. 2 shows an arrangement of cells and an electrical connection in another sealed storage battery as a second embodiment of the present invention.

FIG. 2 shows another battery in which three cell rows, each including two cells, are arranged in parallel to one another. This battery is constructed by further arranging a third cell row 3 having cells 3a and 3b in parallel to the first cell row 1 and the second cell row 2. The cells 3a and 3b in the third cell row 3 are electrically connected in parallel to each other by first intercell connectors 6a and 6b. The adjacent cells included in different cell rows are also electrically connected in parallel to one another. While the cells 1a, 2a and 3a are electrically connected in parallel to one another by a second intercell connector 7a, the cells 1b, 2b and 3b are electrically connected in parallel to one another by a second intercell connector 7b.

Figure 3:
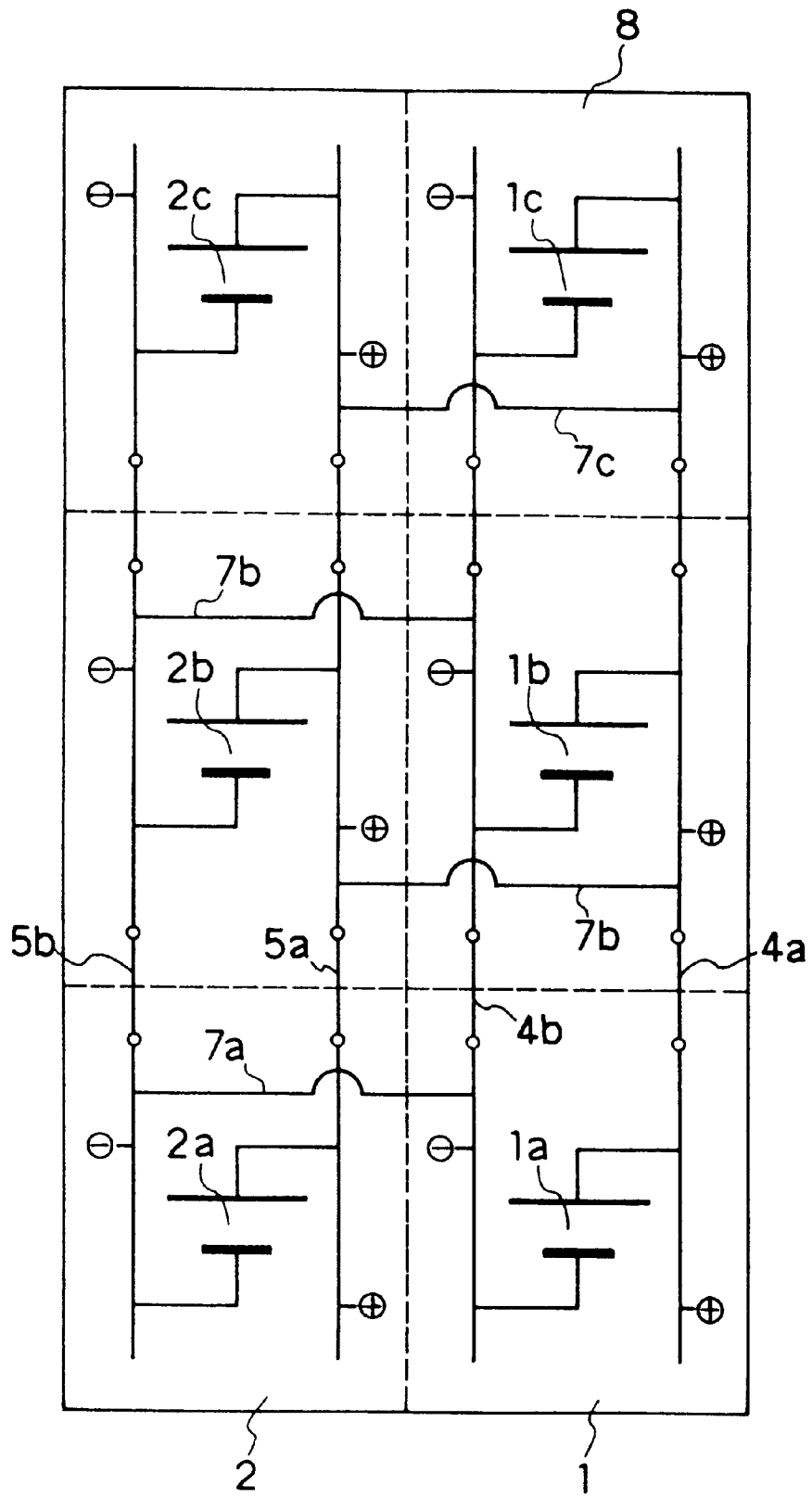
FIG. 3 shows an arrangement of cells and an electrical connection in still another sealed storage battery as a third embodiment of the present invention.

FIG. 3 shows still another structure in which two cell rows, each including three cells, are arranged in parallel to each other. This battery is constructed by arranging a first cell row 1 having cells 1a, 1b and 1c in parallel to a second cell row 2 having cells 2a, 2b and 2c. The adjacent cells included in each cell row are electrically connected to one another by first intercell connectors 4a and 4b or 5a and 5b, whereas the adjacent cells included in different cell rows are electrically connected to each other by a second intercell connector 7a, 7b or 7c.

In this manner, a plurality of cell rows, each including a plurality of cells, can be arranged in parallel to one another. Another possible structure includes three cell rows, each having three cells. Increased number of cells causes a center cell surrounded by several cells to have different conditions of heat radiation from those of the other cells. This causes a significant temperature difference after repeated charging and discharging processes, thereby making the respective cells have different performances. The four-cell structure shown in FIG. 1 is thus most preferable.

Figure 4:
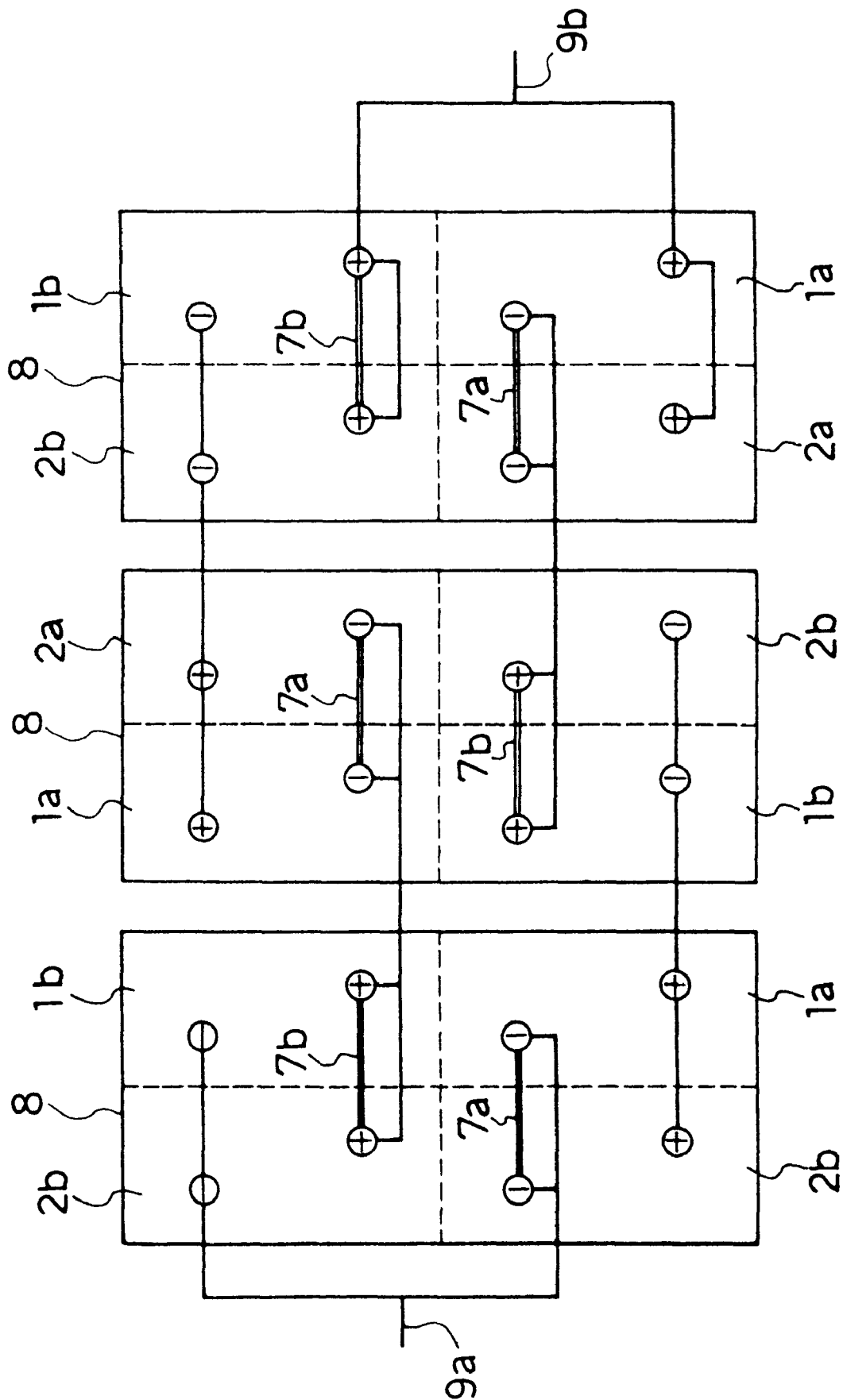
FIG. 4 shows an electrical connection of a battery device, in which three sealed storage batteries shown in FIG. 1 are connected in series.

FIG. 4 is diagram showing an electrical connection of an exemplified structure in which three batteries of four-cell structure as shown in FIG. 1 are connected in series. In each battery having a container 8, adjacent cells included in different cell rows are connected in parallel to each other by connecting either negative electrode terminals or positive electrode terminals via the second intercell connector 7a or 7b as discussed previously. In this example, the respective constituents are further connected via external connectors. In case that the negative electrode terminals are connected with each other via the second intercell connector 7a, the positive electrode terminals are further connected via an external connector. In case that the positive electrode terminals are connected with each other via the second intercell connector 7b, the negative electrode terminals are further connected via an external connector. This structure effectively interferes with an IR drop of the joint portion. In the battery device including three batteries connected in series, electric power is supplied through a negative electrode terminal 9a and a positive electrode terminal 9b.

The structure of the present invention uses the first intercell connectors and the second intercell connectors. In order to prevent both groups of connectors from crossing each other, one group of connectors, preferably the first intercell connectors, are arranged inside the cover, whereas the other group of connectors, that is, the second intercell connectors, are arranged on the cover. In this structure, it is preferable that the second intercell connectors are fitted in recesses formed on the cover and then covered with an insulating compound. This effectively prevents the second intercell connectors from being exposed to the surface of the container.

It is also preferable that the adjacent cells included in each cell row have interconnecting gas phases. In case that the gas phases of the respective cells are independent of one another as shown in conventional batteries, the respective cells may have different absorption reactions of gaseous oxygen evolved in the charging process. This causes a difference in performance between cells, which affects the performance of the battery. When the respective cells in each cell row have interconnecting gas phases, on the other hand, evolution and absorption of gaseous oxygen in the respective cells proceed without any significant difference as if in one identical cell. This does not cause any significant difference in performance between cells, thereby not affecting the performance of the battery. This means that the respective cells included in each cell row function evenly.

It is further preferable that the partitions that separate the adjacent cells in each cell row have apertures formed in the bottom portions thereof for interconnecting the cells. This structure, in combination with the structure of interconnecting the gas phases of the adjacent cells, regulates the surface or the quantity of the electrolyte in each cell at a fixed level during the injection process of the electrolyte, thus realizing the uniform performance of the cells.

The following describes a concrete example, in which the principle of the present invention is applied to a lead acid storage battery for stationary applications.

The principle of the present invention is applicable to sealed alkaline storage batteries, such as nickel-cadmium storage batteries and nickel-metal hydride storage batteries, as well as to the lead acid storage batteries.

Figure 5:
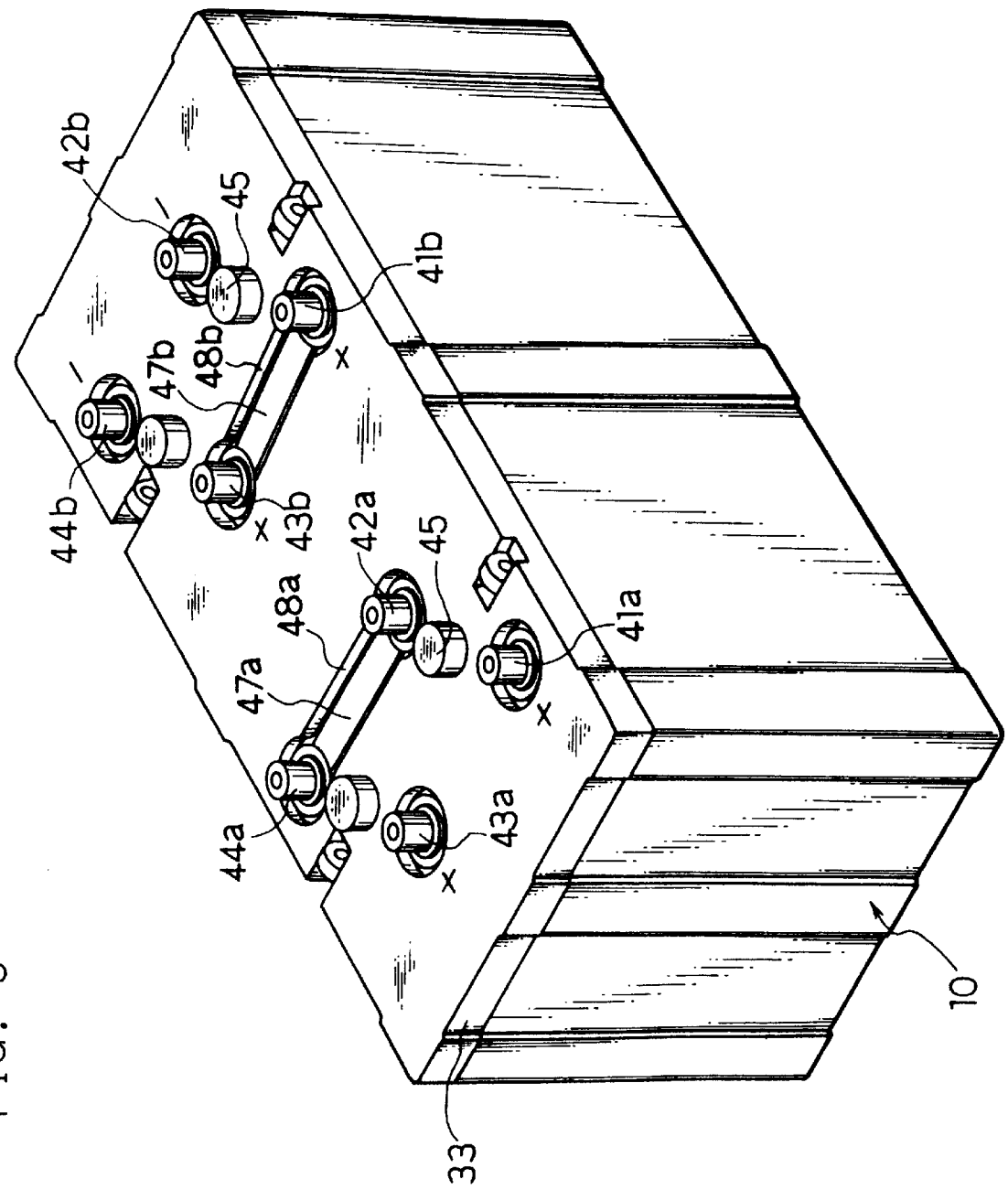
FIG. 5 is a perspective view illustrating a general structure of a lead acid storage battery of the present invention.
Figure 6:
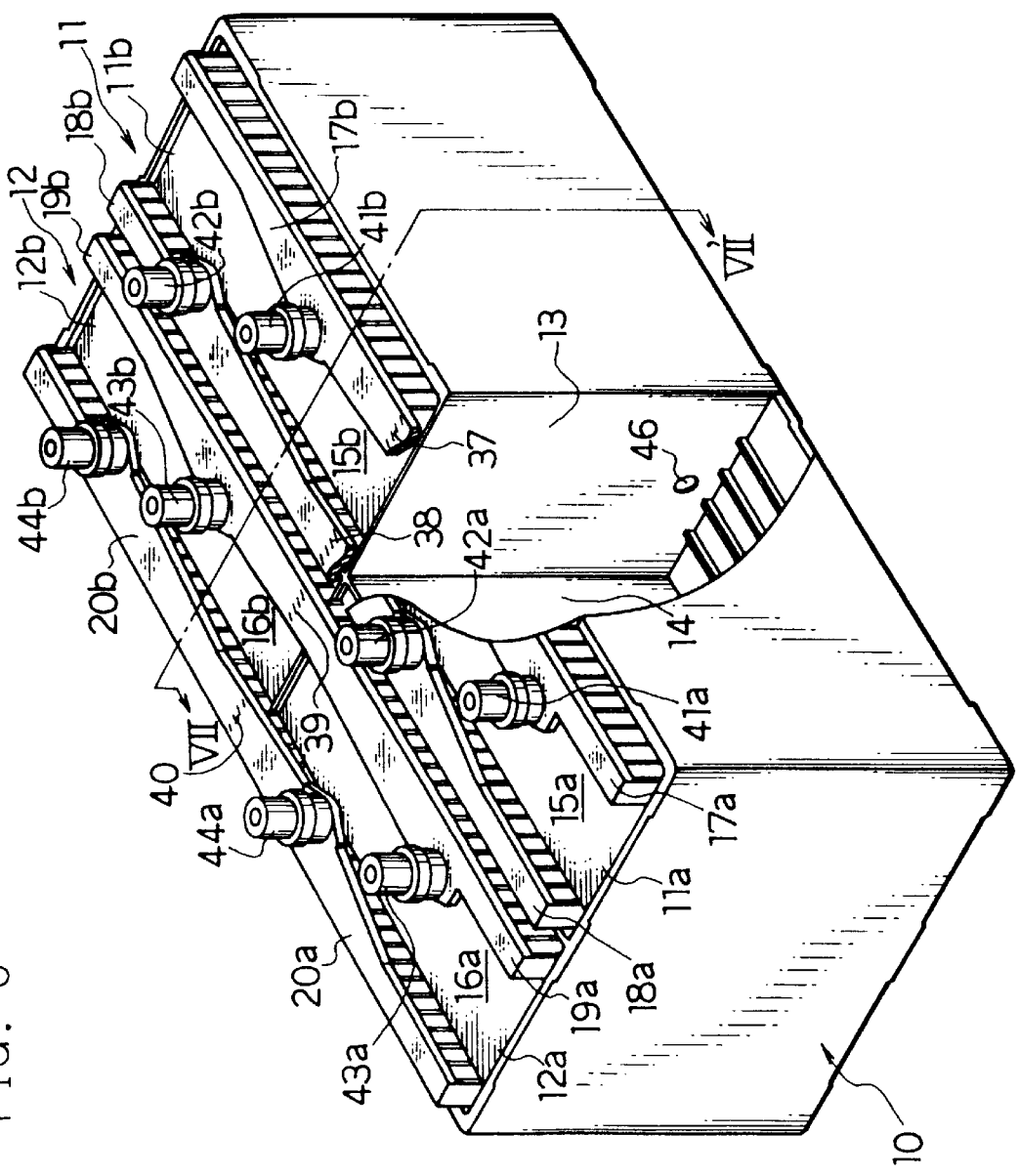
FIG. 6 is a perspective view illustrating the lead acid storage battery of FIG. 5, with part of the monoblock container omitted.
Figure 7:
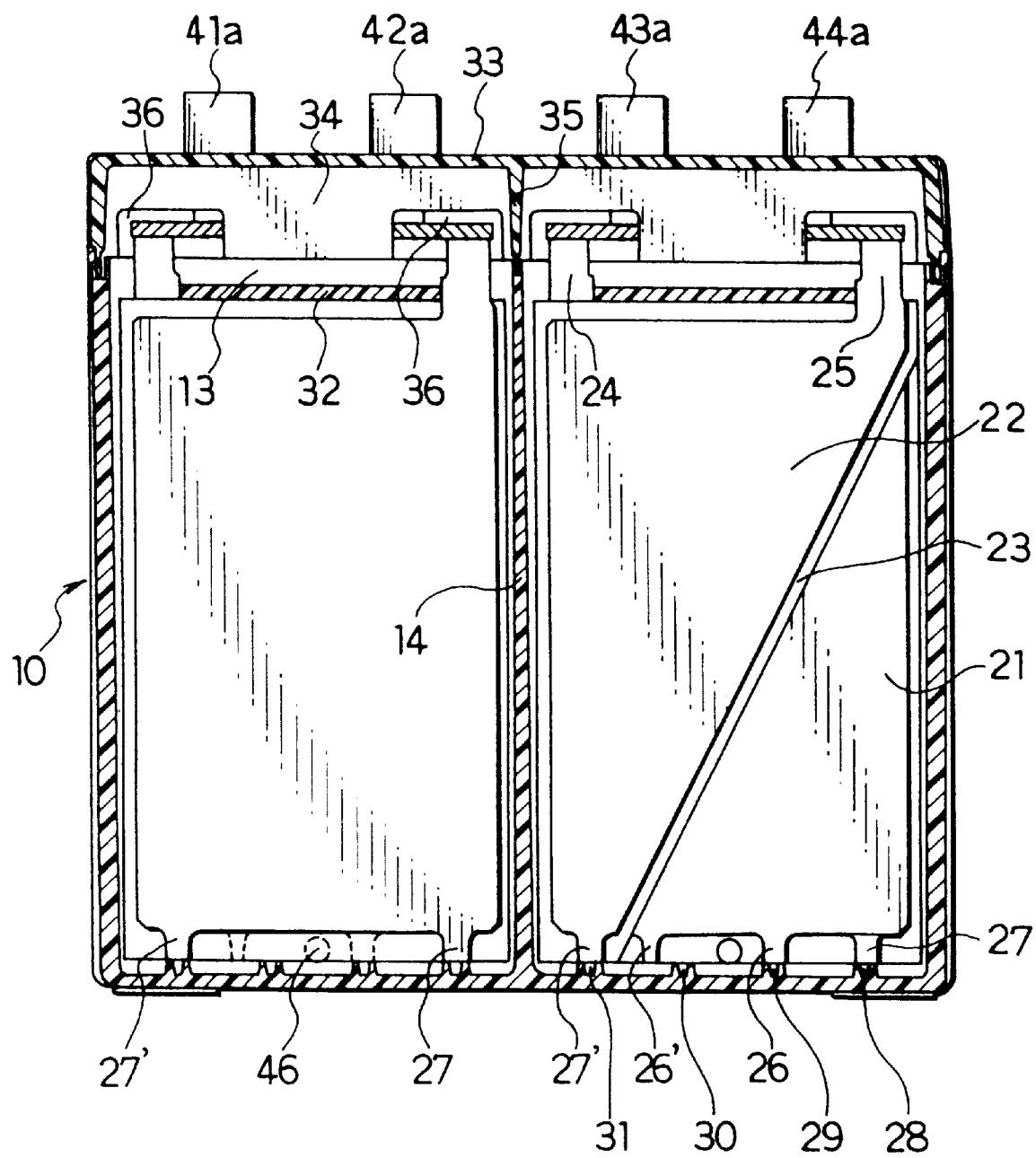
FIG. 7 is a cross-sectional view taken on the line VII–VII' of FIG. 6.

FIG. 5 is a perspective view illustrating a whole structure of a lead acid storage battery of the present invention. FIG. 6 is a perspective view illustrating the lead acid storage battery of FIG. 5, wherein an assembly element is disposed in each cell compartment, with part of a monoblock container omitted. FIG. 7 is a cross-sectional view taken on the line VII–VII' of FIG. 6. The battery shown herein represents a concrete example of the battery structure of FIG. 1 discussed above.

A monoblock container 10 composed of an ABS resin includes a first cell row 11 having cell compartments 11a and 11b joined in a predetermined direction and a second cell row 12 having cell compartments 12a and 12b joined in the predetermined direction, which are arranged in parallel to each other. The cell compartments 11a and 11b and the cell compartments 12a and 12b respectively included in the identical cell rows are separated by partitions 13, while the cell compartments 11a and 12a and the cell compartments 11b and 12b respectively included in the different cell rows are separated by partitions 14. Assembly elements 15a, 15b, 16a and 16b are respectively disposed in the four cell compartments 11a, 11b, 12a and 12b.

Each assembly element is constructed by stacking positive electrode plates 21 and negative electrode plates 22 via separators 23 in a specific direction, which is identical with the predetermined direction of joining the cell compartments in each cell row. The assembly element 22 is inserted into the corresponding cell compartment under a pressure of 20 kg/dm$^2$ in the stacking direction in the cell compartment. In each assembly element, lugs 24 of the positive electrode plates 21 and lugs 25 of the negative electrode plates 22 are protruded above an opening of the container 10 and respectively connected to straps, with which a positive electrode terminal and a negative electrode terminal made of lead-tin alloy are further connected. In accordance with a concrete structure, the assembly elements 15a and 15b have positive electrode straps 17a and 17b and negative electrode straps 18a and 18b, respectively. The assembly elements 16a and 16b have positive electrode straps 19a and 19b and negative electrode straps 20a and 20b, respectively. The positive electrode plates and the negative electrode plates are prepared by filling cast grids made of lead-calcium-tin alloy with a paste mainly composed of lead oxide powder and aging, drying, and electroforming. Glass fiber mats are used for the separators 23.

In each cell row, the assembly elements are electrically connected in parallel to each other. In accordance with a concrete structure, the assembly element 15a in the cell compartment 11a and the assembly element 15b in the cell compartment 11b have the positive electrode straps 17a and 17b that are connected with each other via a first intercell connector 37 above the partition 13 and the negative electrode straps 18a and 18b that are connected with each other via a first intercell connector 38 above the partition 13. The assembly element 16a in the cell compartment 12a and the assembly element 16b in the cell compartment 12b have the positive electrode straps 19a and 19b that are connected with each other via a first intercell connector 39 above the partition 13 and the negative electrode straps 20a and 20b that are connected with each other via a first intercell connector 40 above the partition 13. The first intercell connectors 37, 38, 39 and 40 are made of lead or lead alloy. The assembly elements 15a, 15b, 16a and 16b have positive electrode terminals 41a, 41b, 43a and 43b on the straps 17a, 17b, 19a and 19b and negative electrode terminals 42a, 42b, 44a and 44b on the straps 18a, 18b, 20a and 20b, respectively.

The positive electrode plate 21 and the negative electrode plate 22, respectively, have a pair of feet 26, 26' and 27,27' on the bottom ends thereof. Each cell compartment has four ribs 28, 29, 30 and 31 on the bottom of the container. One foot 26 which is distant from the lug 24 of the positive electrode plate 21 of the pair of feet of the positive electrode plate 21 rests on the rib 29, whereas the other foot 26' does not rest on the rib. Both the feet 27,27' of the negative electrode plate 22 rest on the ribs 28 and 31, respectively. Baffle sheets 32 mainly composed of synthetic resin fibers are arranged between the lugs 24 and 25 and mounted on the respective assembly elements. The baffle sheets 32 prevent the electrolyte from being scattered at the time of initial charging.

A cover 33 used for sealing the opening of the container 10 have partitions 34 and 35, which respectively correspond to the partitions 13 and 14 of the container 10. The partition 34 has openings 36,36 that allow passage of the first intercell connectors. These openings also function to interconnect the gas phases of the adjacent cells included in an identical cell row. The cover 33 also has bushings so arranged to correspond to the respective cell compartments for connecting with the positive electrode terminal and the negative electrode terminal and safety valves 45. Each safety valve 45 functions to release an evolved gas into the atmosphere in response to an increase in internal pressure of the cell, and has a rubber valve cap arranged therein for preventing the air, especially oxygen, from flowing into the cell.

The partition 13 of the container 10 is further provided with an aperture 46 for interconnecting the adjacent cell compartments in the same cell row.

This battery is assembled in the following manner. After the assembly element is inserted into each cell compartment of the container 10 as discussed above, the assembly elements in the same cell row are connected in parallel to each other. The container 10 is then covered with and bonded to the cover 33. While the opening of the container 10 has a recess, the opening of the cover 33 has a projection that is fitted in the recess. After an epoxy resin adhesive is applied in the recess, the cover 33 is laid over the container 10, so that the container 10 and the cover 33 are securely bonded to each other via the adhesive. The lead-tin alloy terminals of the plates are fitted in and welded to the bushings of the cover 33.

The adjacent cells included in different cell rows are connected in series via second intercell connectors. In accordance with a concrete structure, the negative electrode terminal 42a of the cell compartment 11a and the negative electrode terminal 44a of the cell compartment 12a are connected via a second intercell connector 47a, whereas the positive electrode terminal 41b of the cell compartment 11b and the positive electrode terminal 43b of the cell compartment 12b are connected via a second intercell connector 47b. The cover 33 has recesses 48a and 48b on the upper surface thereof for receiving these second intercell connectors 47a and 47b. Although not illustrated, the recesses 48a and 48b are filled with an insulating compound, such as epoxy resin, in order to prevent the second intercell connectors from being directly exposed to the outside of the cover 33. The recesses surrounding the positive electrode terminals and the negative electrode terminals are also filled with a compound such as epoxy rein, in order to prevent a leakage of an electrolyte through the clearances between the terminals and the cover 33.

The above procedure gives a battery that has positive electrode terminals and negative electrode terminals corresponding to the respective cells and arranged on the upper surface of the cover 33 and includes four cells electrically connected in parallel to one another via the first intercell connectors and the second intercell connectors. The second intercell connectors 47a and 47b are, for example, copper plates coated with a lead alloy.

An electrolyte composed of diluted sulfuric acid having a specific gravity of 1.26 is poured into the respective cell compartments through the holes of the cover 33, in which the safety valves 45 are to be fitted later. Since the glass fiber separators are used, it takes some time to allow the electrolyte to be absorbed into the assembly element. The aperture 46 formed in the partition 13 of the container 10 and the opening 36 formed in the partition 34 of the cover 33 enable the cell compartments included in the same cell row to have the identical quantities of the electrolyte. The safety valves 45 are attached to the cover 33 one hour after the injection of the electrolyte. The assembly elements are charged initially at an electric current of 0.05 C for 10 hours. After discharged at an electric current of 0.1 C, the assembly elements are charged again at a constant current of 0.1 C for 13 hours. This process substantially realizes the absence of free electrolyte and completes the storage battery.

As discussed above, the present invention provides a sealed storage battery which has a less variation in characteristics of cells and enables all the cells to be discharged even when positive electrode terminals and negative electrode terminals of the cells are selected in any combination. This structure increases the degree of freedom of connection when a large number of the sealed storage batteries of the present invention are electrically connected in parallel and/ or in series to constitute a power source device having a high voltage and a large capacity.

Preferred structures of the lead acid storage batteries described above will be described more specifically.

EXAMPLE 1

Fixed structure of assembly element against elongation of positive electrode plate Among the lead acid storage batteries of the above structure, sealed storage batteries having a long life and used for power sources for equipment of receiving and distributing electricity and transforming stations and power sources for emergency lighting in buildings have large-sized electrode plates, which results in a significant elongation of the positive electrode plates due to corrosion. The upper portion of each electrode plate is pressed by a strap connecting its lug and terminals linked with the strap, whereas the two feet of the lower portion rest on the ribs. This structure interferes with absorption of the elongation. The positive electrode plate accordingly has a local crook, which may cause a short circuit between the positive and negative electrodes. Another problem arises when the long, large-sized electrode plates are inserted into the container; the feet of the electrode plate do not correspond to the ribs of the container and the electrode plate may be shifted and slip off.

Figure 8:
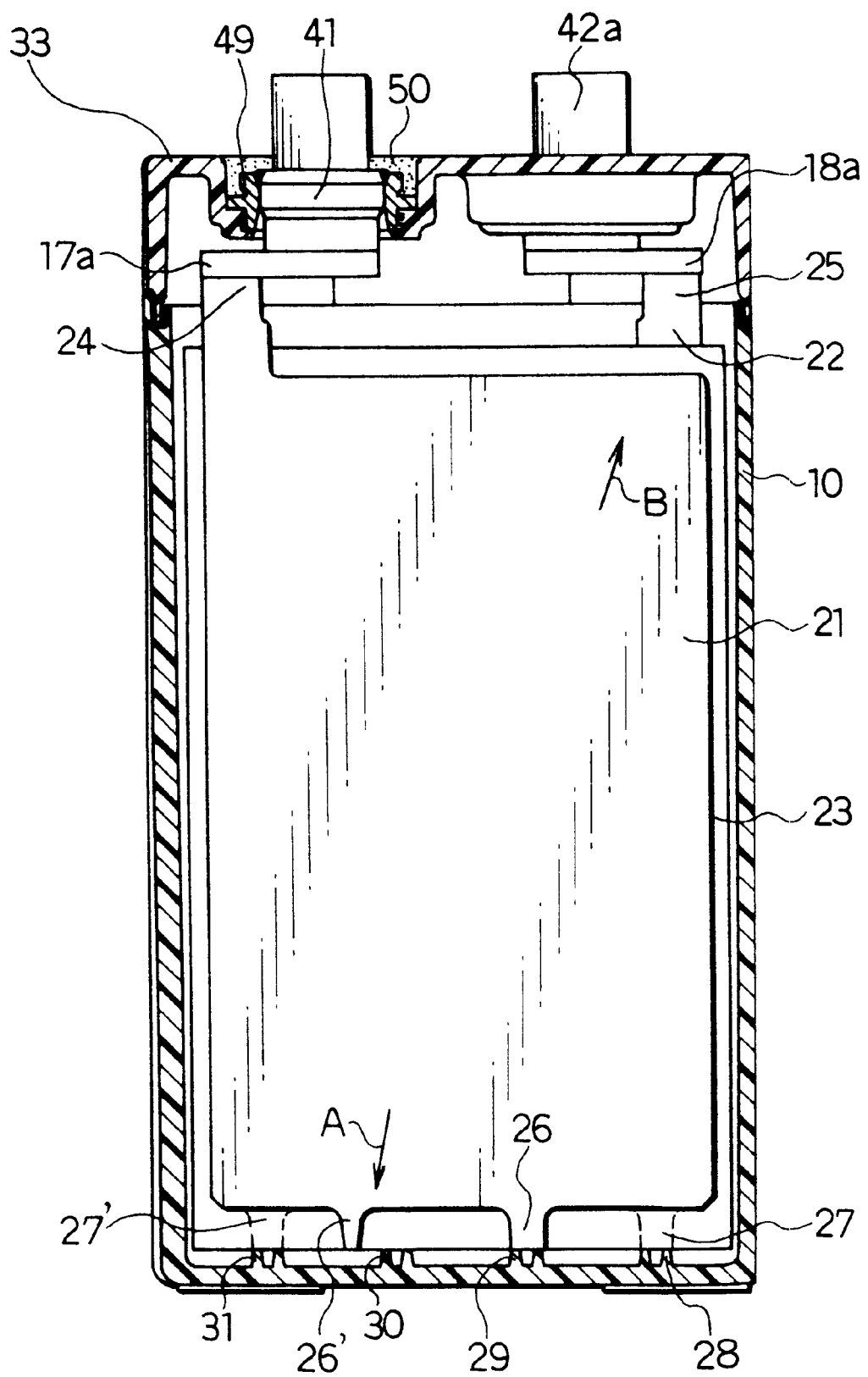
FIG. 8 is a vertical cross-sectional view showing an essential part of the lead acid storage battery.
Figure 9:
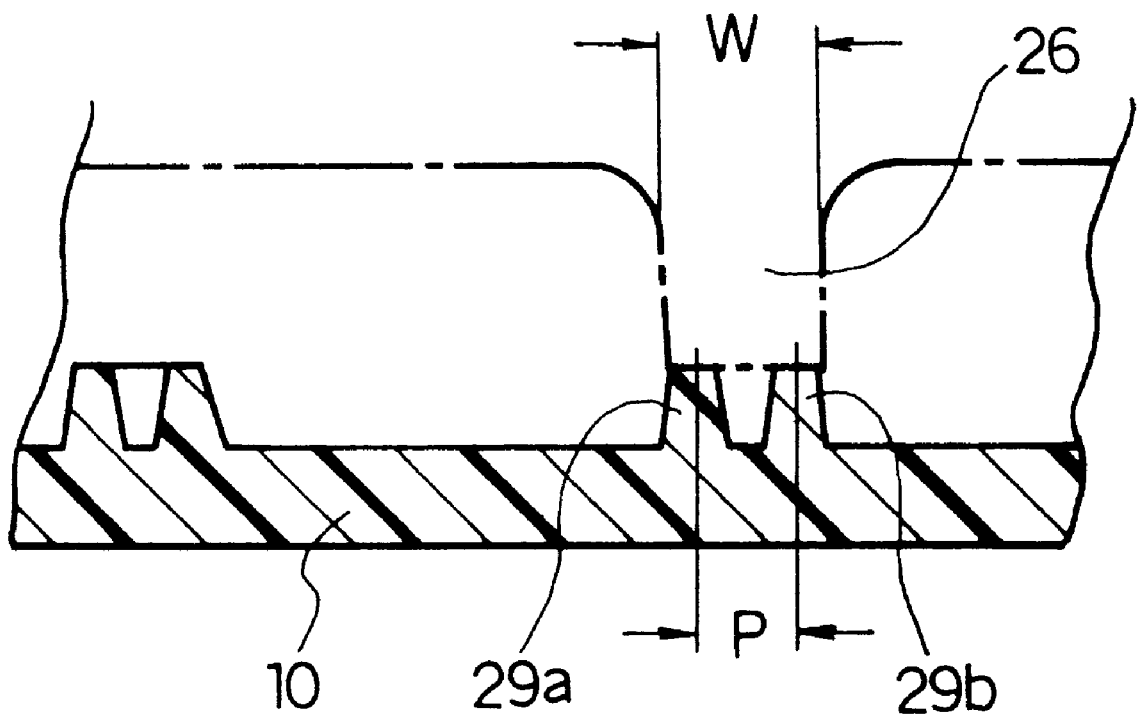
FIG. 9 is an enlarged cross-sectional view showing a bottom portion of the container of the lead acid storage battery.

A fixed structure of the assembly element against such an elongation of the positive electrode plate is described referring to FIGS. 8 and 9.

As mentioned previously, the four ribs 28, 29, 30 and 31, each consisting of a pair of parallel ribs extending in the stacking direction of the electrode plates, are arranged at substantially equal intervals inside the bottom face of the container 10. The positive electrode plate 21 has a pair of feet 26,26' almost symmetrically arranged on the bottom end thereof, whereas the negative electrode plate 22 has a pair of feet 27,27' almost symmetrically arranged on the bottom end thereof. The pair of feet 27,27' of the negative electrode plate 22 are designed to rest on the ribs 28 and 31, respectively. One foot 26 of the positive electrode plate 21 rests on the rib 29, whereas the other foot 26' is set at a position distant from the rib 30.

The positive electrode plates 21 are, for example, cast grids composed of Pb-Ca-Sn alloy, and the negative electrode plates 22 are cast grids composed of Pb-Ca alloy and coated with a paste of an active material.

The positive electrode plate 21 is, for example, approximately 140 mm in width and 250 mm in height and has the foot 26 having a width W of approximately 10 mm and a height of approximately 12 mm. The other foot 26' of the positive electrode plate 21 that does not rest on the rib has a narrower width. Both feet of the negative electrode plate 22 have the same dimension as that of the foot 26 of the positive electrode plate 21. The bottom portion of the container 10 has a thickness of approximately 6 mm. Each rib is composed of a pair of ribs having a width of approximately 3 mm and a height of approximately 4.5 mm and arranged across a central gap P of 6 mm as shown in FIG. 9. For example, the rib 29 consists of a pair of ribs 29a and 29b.

The cover 33 has a bushing ring 49 that is integrally formed therewith, made of a lead alloy, and arranged at a position corresponding to a positive electrode terminal, for example, 41a. The bushing 49 and the large-calibered portion of the positive electrode terminal 41a are heated using a burner and welded to each other, and the terminal element is then sealed with a compound 50. The negative electrode terminal 42a is welded to a bushing and sealed in a similar manner.

In the lead acid storage battery shown in FIG. 8, the positive electrode plate 21 has, on its left-side end, a lug 24 which is connected to a strap 17a, and the strap 17a is further connected to a terminal 41a. This structure fixes the upper left end of the positive electrode plate 21. In the lower portion of the positive electrode plate 21, the right-side foot 26, which is opposite to the position of the lug 24, rests on the rib 29. This structure fixes the lower right end of the positive electrode plate 21. The positive electrode plate 21 accordingly has a free upper right end and a free lower left end.

Even when the positive electrode plate used over a long time has an elongation due to corrosion, this structure enables the elongation of the plate to be released as shown by arrows A and B in FIG. 8. This effectively prevents a local crook of the positive electrode plate as observed in the conventional structure and thereby a short circuit of the positive and negative electrodes.

In such lead acid storage batteries, the elongation of the positive electrode plate due to corrosion is 1.5% after 10 years and 2.5% after 13 years under the conditions of a circumferential temperature of 25° C. and a floating voltage of 2.23 V. When these data are applied to this example, the positive electrode plate originally having a height of 250 mm is extended to approximately 254 mm after 10 years and approximately 256 mm after 13 years. The structure of the present invention effectively prevents a short circuit due to the elongation of the positive electrode plate.

The negative electrode plate causes substantially no elongation and has a pair of feet 27,27' respectively resting on the ribs 28 and 31, which prevent the negative electrode plate from slipping off by the movement of releasing the elongation of the positive electrode plate.

Both the positive electrode plate and the negative electrode plate have feet in a substantially symmetrical arrangement, so that the lower ends of the electrode plates can be adjusted readily on the base. In the conventional structure, the feet of the positive electrode plate and the negative electrode plate are arranged alternately; for example, a foot of the negative electrode plate, a foot of the positive electrode plate, a foot of the negative electrode plate, and a foot of the positive electrode plate from the left to the right in FIG. 8. When the lower ends of the plates are adjusted on the base, the moment of the force at pressing each plate shifts in the direction of the center of gravity of the plate, that is, the negative electrode plate shifts to the left and the positive electrode plate to the right. It takes much time and labor to set the plates in an appropriate arrangement. In the structure of the example, on the other hand, both the positive electrode plate and the negative electrode plate have feet in a substantially symmetrical arrangement. This structure is free from the above problem and enables the lower ends of the electrode plates to be readily adjusted.

The bottom of the container 10 has a rib 30 on which no foot of the plate rests. The four ribs arranged at substantially identical intervals effectively prevent the strength of the container 10 from being lowered due to sinking in the process of molding the container 10. Each rib consists of a pair of parallel ribs extending in the stacking direction of the plates. Even when the foot of long, large-sized plate is a little shifted from the position of the rib during insertion of the assembly element, the foot can securely rest on one of the ribs.

As discussed above, the lead acid storage battery according to the present invention includes a container having ribs on its bottom portion, assembly elements respectively resting on the ribs in the container, a cover for sealing the opening of the container, and positive straps connecting lugs of positive electrode plates and negative straps connecting lugs of negative electrode plates, each being linked with a positive terminal and a negative terminal and being fixed to the cover. The positive electrode plate has a pair of feet that are formed on the lower end thereof in a substantially symmetrical arrangement, and is further provided with a lug connected to a strap that is disposed at a position shifted either to the left or to the right. One of the feet corresponding to the position having the lug does not rest on any rib, while the other foot rests on a rib.

This structure gives a lead acid storage battery that has a long life and does not cause a short circuit even when the positive electrode plate has an elongation. The lead acid storage battery has a structure wherein a foot of the electrode plate can securely rest on the rib even when the foot of the long, large-sized electrode plate is a little shifted from the position of the rib in the process of assembly.

EXAMPLE 2

Structure of terminal element

The structure of a terminal element is described by referring to FIGS. 10 to 14.

Figure 12:
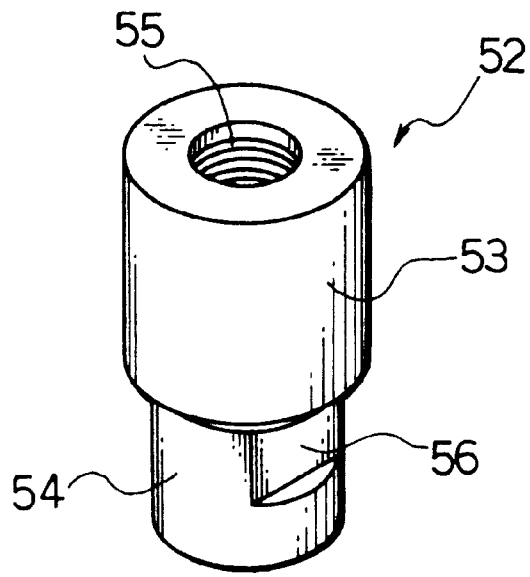
FIG. 12 is a perspective view illustrating a terminal member of the lead acid storage battery.

A lead alloy terminal element 51 having a copper terminal member 52 embedded in the head portion thereof is welded to a lead alloy strap 17a, to which lugs of electrode plates, for example, positive electrode plates, of each cell in a container is welded. The terminal element 51 corresponds to, for example, the terminal 41a. The terminal member 52 has an upper large-calibered section 53 and a lower small-calibered section 54 as shown in FIG. 12. The large-calibered section 53 has a tapped hole 55 open to the top surface thereof, whereas the small-calibered section 54 is embedded in the lead alloy terminal element 51. The small-calibered section 54 has a pair of notches 56 for preventing rotations. In order to enhance the matching with lead alloy, the terminal member 52 is plated with a solder prior to being embedded into the terminal element 51.

A lead alloy bushing 49, in which the terminal element 51 is fitted, is formed integrally with the cover 33.

Figure 10:
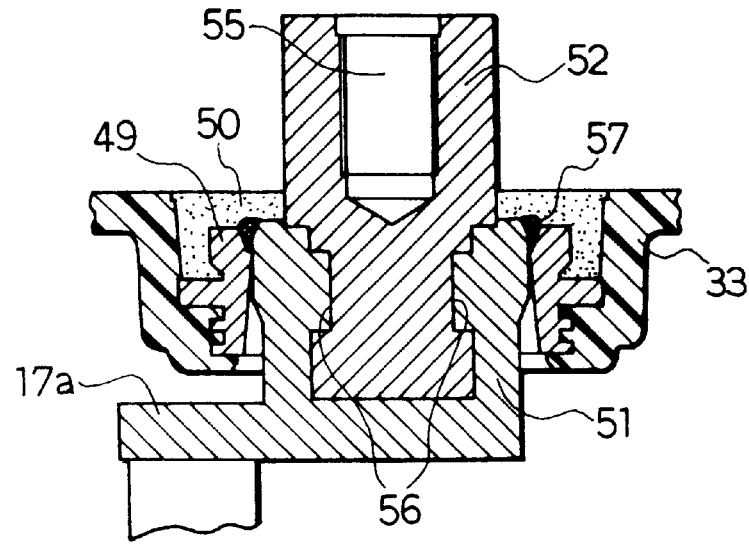
FIG. 10 is a cross-sectional view showing a terminal portion of the lead acid storage battery.
Figure 11:
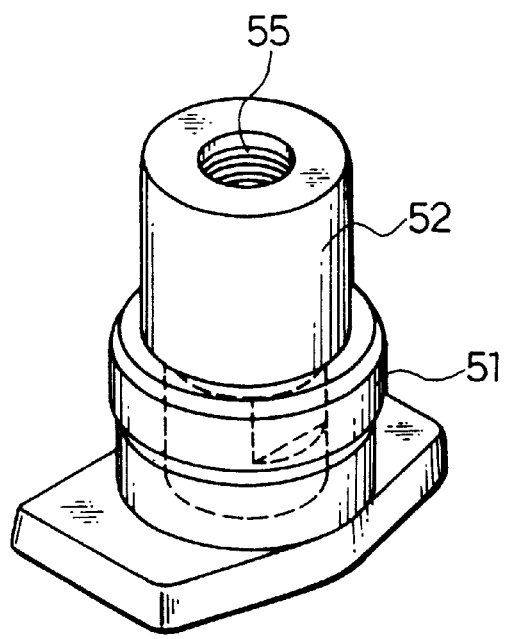
FIG. 11 is a perspective view illustrating a lead alloy terminal element of the lead acid storage battery.

When the cover 33 is laid over the container 10 after the terminal elements 51 with the terminal members 52 embedded therein are welded to the straps of the respective cells, each terminal element 51 is fitted in the bushing 49 and the terminal member 52 is protruded over the cover 33. After the cover 33 is bonded to the container 10, the head portion of the terminal element 51 and the bushing 49 are heated using a burner and welded to each other. This process enables the terminal element 51 to be fixed to the cover 33. The terminal element 51 and the bushing 49 are joined with each other via a weld 57 as shown in FIG. 10.

It is preferable that the head portion of the lead alloy terminal element 51 is formed to have a thicker wall. This increases the strength for fixing the terminal member 52 and ensures its secure welding to the bushing 49.

A compound 50, such as epoxy resin, is then injected into these joints for sealing.

Figure 14:
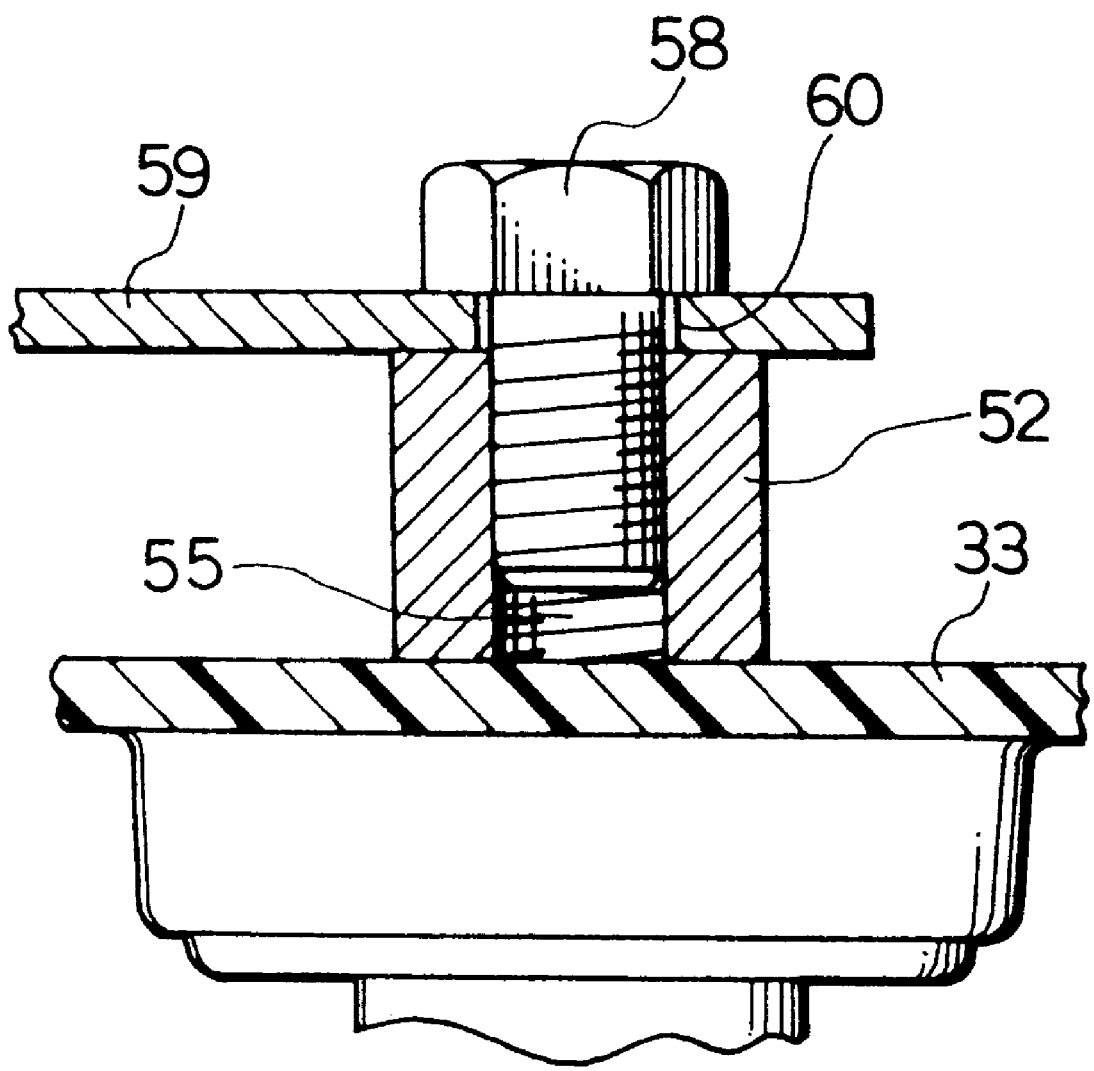
FIG. 14 is a cross-sectional view showing an essential part, in which a connecting member is fixed to the terminal member.
Figure 15:
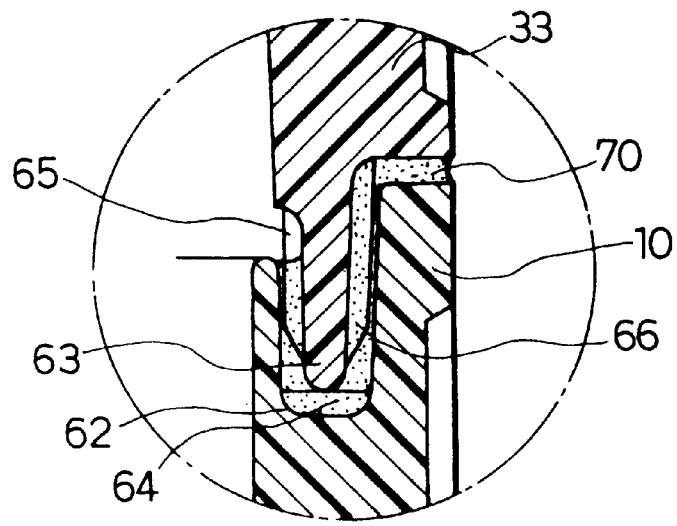
FIG. 15 is an enlarged cross-sectional view illustrating a joint portion of the container and the cover in the lead acid storage battery of the present invention.
Figure 16:
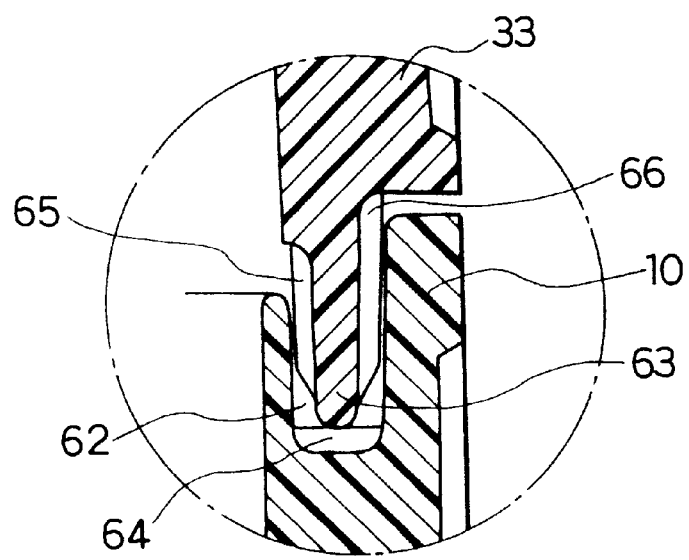
FIG. 16 is an enlarged cross sectional view illustrating the joint portion without an adhesive.

FIG. 14 shows the state of fixing a connecting member 59 to the terminal member 52 with a bolt 58. The bolt 58 passes through a hole 60 of the connecting member 59 and is screwed into the tapped hole 55 formed in the terminal member 52, so that the connecting member 59 is easily fixed to the terminal member 52. Since the tapped hole 55 is open to the top surface of the terminal member 52, the connecting member 59 can be rotated at an arbitrary angle around the bolt 58. The connecting member 59 is thus not restricted specifically by the position of the corresponding terminal, with which the connecting member 59 is linked. This facilitates connecting the neighboring batteries as shown in FIG. 5, for example, arranged in the longitudinal direction or in parallel either in series or in parallel. Unlike the conventional structure, no nuts are required for fixing the connecting member.

Figure 13:
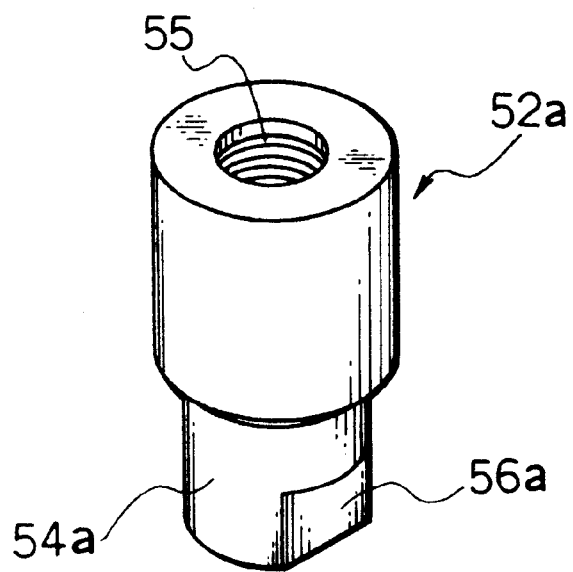
FIG. 13 is a perspective view illustrating another terminal member having a different structure.

FIG. 13 shows another possible structure of the terminal member, in which a small-calibered portion 54a has only one notch 56a. A terminal member 52 embedded in a lead or lead alloy terminal element 51 has anti-rotation means arranged unsymmetrically with respect to the central axis of the terminal member 52. Even when a rotating force is applied to the terminal member 52 in the process of fixing a connecting member to a tapped hole 55 of the terminal member 52 with a bolt, the terminal member 52 does not rotate in the relatively soft lead or lead alloy terminal element 51 and thus does not unintentionally slip off.

As discussed above, a terminal member that is composed of a metal with a favorable electrical conductivity and has a tapped hole open to the top surface thereof is embedded into a head portion of a lead or lead alloy terminal element, in such a manner that allows at least the top surface of the terminal member is exposed.

It is preferable that the terminal member is made of copper or a copper alloy.

It is further preferable that the terminal member embedded in the lead or lead alloy terminal element has anti-rotation means arranged unsymmetrically with respect to the central axis of the terminal member.

The above structure gives a lead acid storage battery that has a large degree of freedom in the direction of connecting a connecting member and can be discharged at a large electric current. Unlike the conventional structure, no nut but only a bolt is required for fixation of the connecting member.

EXAMPLE 3

Structure of joint of container and cover

The structure of the joint of the container and the cover is described by referring to FIGS. 15 to 18.

In the battery described herein, each cell has a width of approximately 170 mm, a length of approximately 340 mm in the stacking direction of plates, and a height of approximately 320 mm.

Figure 18:
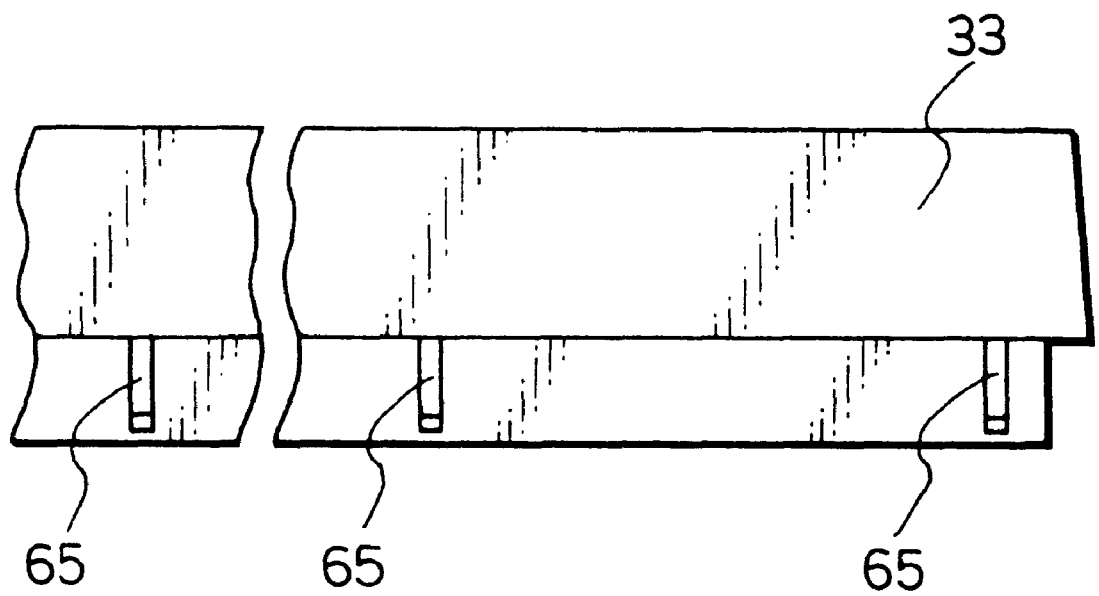
FIG. 18 is a front view illustrating an essential part of the container.
Figure 20:
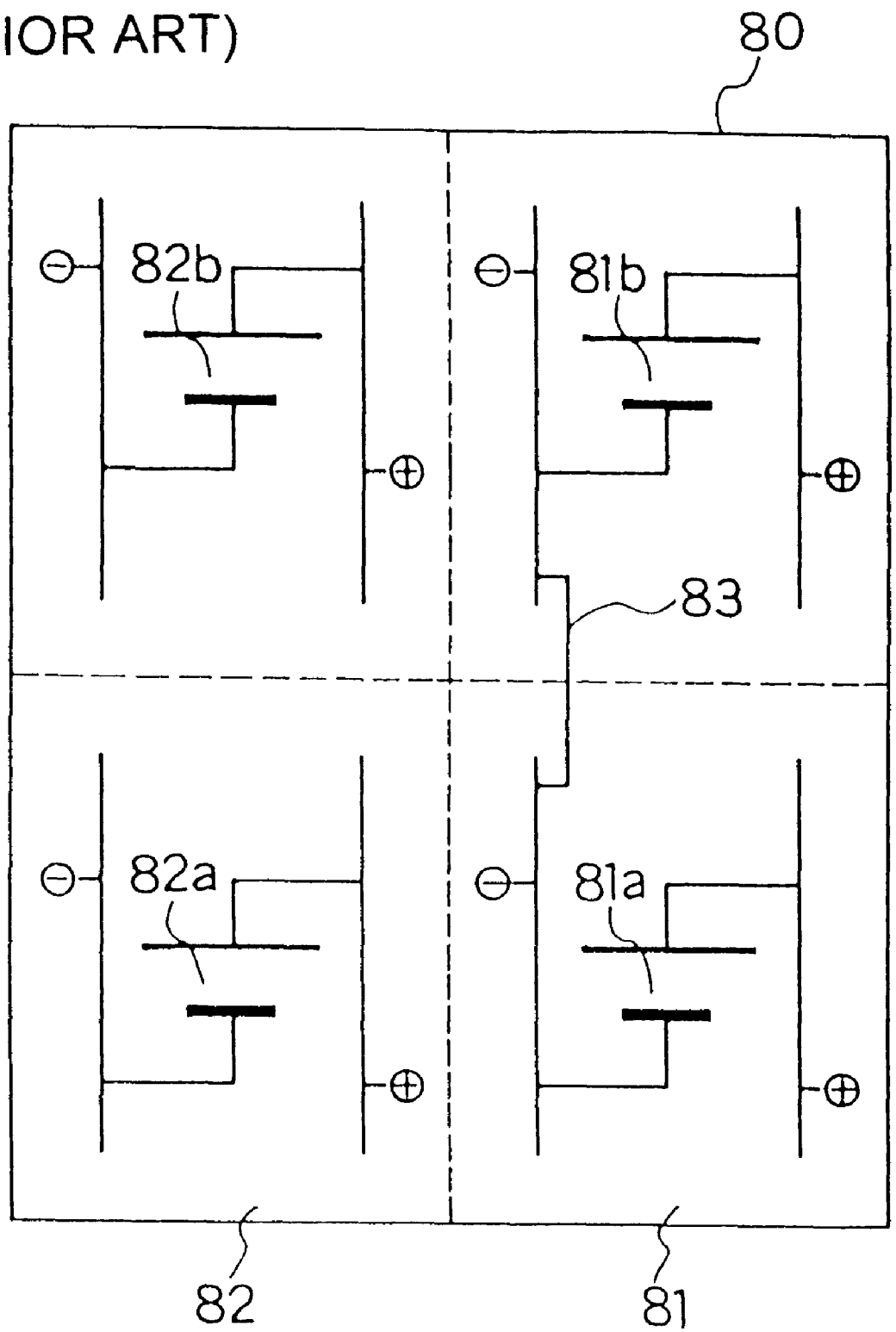
FIG. 20 shows an arrangement of cells and an electrical connection in a conventional sealed storage battery.

The upper opening of the container 10 has a recess 62, whereas the lower opening of the cover 33 has a projection 63 fitted in the recess 62. The projection 63 has vertical ribs 65 and 66 formed on the surface thereof at appropriate intervals. The recess 62 has a width of approximately 4 mm and a depth of approximately 9.5 mm, and the projection 63 has a thickness of approximately 1.6 mm. As shown in FIG. 18, the ribs 65, each having a width of approximately 2 mm and a length of approximately 8 mm, are arranged at intervals of approximately 80 mm. The ribs 66, each having a width of approximately 2 mm and a length of approximately 8 mm, are also arranged at intervals of approximately 80 mm at positions corresponding to the ribs 65.

The ribs 65 and 66 can hold a fixed space between the surface of the projection 63 and the inner face of the recess 62. This allows an adhesive layer 70 of a fixed thickness to be interposed between the surface of the projection 63 and the inner face of the recess 62, thereby enabling the joint of the projection 63 and the recess 62 to have a uniform adhesive strength over the whole circumference.

Although it is not necessary to arrange the ribs 65 and 66 at the corresponding positions on the outer surface and the inner surface of the projection 63, such arrangement preferably allows the projection 63 to be located on the center of the recess 62.

Ribs 64 are formed at appropriate intervals on the bottom surface of the recess 62 of the container 10. The ribs 64, each having a width of approximately 2 mm and a height of approximately 1 mm, are arranged at intervals of approximately 150 mm. These ribs 64 prevent the projection 63 from reaching the bottom of the recess 62 but enable an adhesive layer of a fixed thickness to be interposed between the free end of the projection 63 and the bottom of the recess 62. The ribs 64 also form a fixed space between one flange, that is, an inner flange in the example of FIG. 15, and a corresponding step of the cover 33. When the projection 63 is inserted into the recess 62 filled with the adhesive 70, the adhesive pressed out by the projection 63 flows into this space and enhances the adhesive strength. It is preferable that the ribs 64 are arranged to be distant from the vertical ribs 65 and 66. When these ribs are formed at the identical position, sections without any adhesive overlap and cause locally weak adhesive strength.

Figure 17:
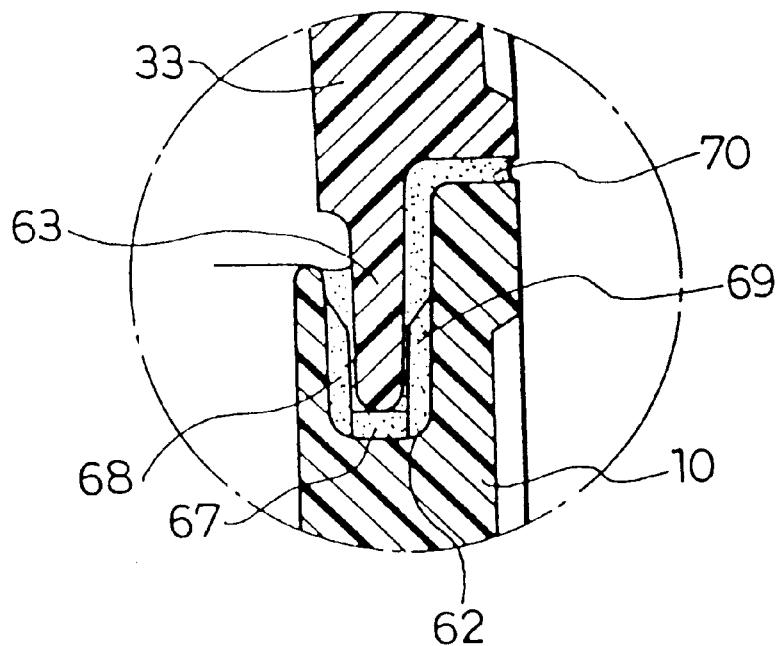
FIG. 17 is an enlarged cross-sectional view illustrating another possible structure of the joint portion of the container and the cover.

Although the container 10 has the recess 62 and the cover 33 has the projection 63 in the above example, the container may have a projection and the cover a recess, alternatively. FIG. 17 shows another possible structure, in which the container 10 has ribs 67 for restricting insertion of the projection 63 into the recess 62 as well as ribs 68 and 69 for defining the space between the surface of the projection 63 and the inner face of the recess 62.

It is preferable that vertical ribs are formed on the joint of the partitions of the container and the cover.

Figure 19:
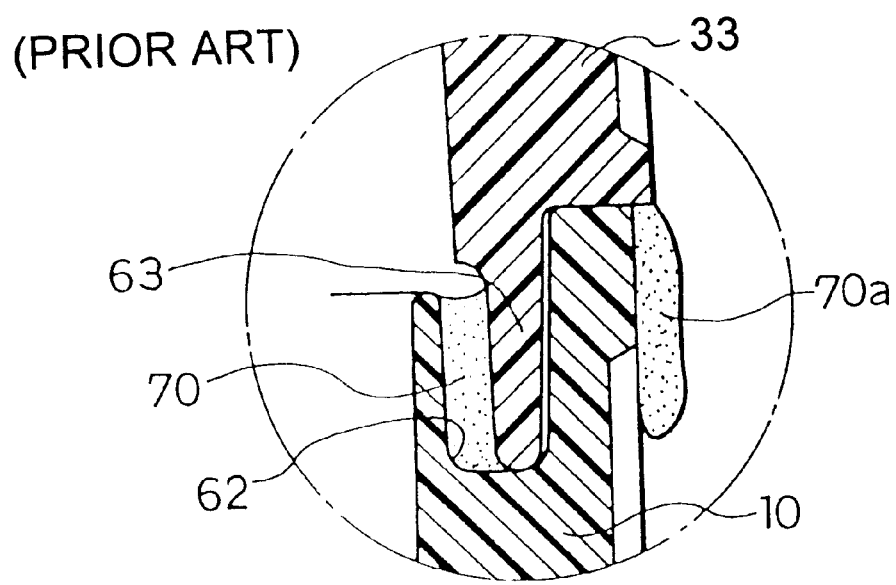
FIG. 19 is an enlarged cross sectional view illustrating a joint portion of a container and a cover in a conventional lead acid storage battery.

FIG. 19 shows the conventional structure of the joint of the container and the cover, in which a recess 62 is formed in an end face of the opening of the container 10 and a projection 63 fitted in the recess 62 is arranged at the opening of the cover 33. When the cover 33 is laid over the container 10, the projection 63 is fitted into the recess 62 of the container 10 which is previously filled with an adhesive 70. Especially in a large-sized container, deflection of the engaged portion of the recess 62 and the projection 63 may prevent the projection 63 from being located on the center of the recess 62. For example, when the projection 63 is displaced to one side in the recess 62 as shown in FIG. 19, a part 70a of the adhesive on the displaced side is pressed out of the recess 62. This removes a considerable amount of the adhesive from that portion and thereby decreases the adhesive strength.

The local weakness of adhesive strength causes the cover to come off during the carriage or installation of the battery, or a gas evolved at the time of overcharging to leak outside, thereby decreasing the quantity of the electrolyte or causing other troubles.

As discussed above, the present invention gives a lead acid storage battery, in which a projection formed on the end face of the opening of one of the container and the cover for sealing the opening of the container is fitted into a recess formed in the end face of the opening of the other and bonded thereto via an adhesive. A plurality of vertical ribs for defining the space between the surface of the projection and the inner face of the recess are formed on at least either the inner face of the recess or the surface of the projection.

A plurality of ribs for restricting insertion of the projection into the recess are also formed on at least either the bottom surface of the recess or the free end of the projection.

The above structure ensures secure adhesion of the container to the cover and gives a lead acid storage battery having stable quality.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A sealed lead acid storage battery comprising:

a monoblock container, in which at least two cell rows, each cell row including a plurality of cell compartments linked in a predetermined direction, are arranged adjacent to and in parallel to each other, each cell compartment being separated by first partitions;

a cover having second partitions that correspond to said first partitions of said monoblock container for separating the respective cell compartments;

plural assembly elements, each assembly element comprising a plurality of positive electrode plates and negative electrode plates that are stacked via separators in the predetermined directions, along which the cells of each cell now are linked with one another, and accommodated in each cell compartment;

a positive electrode strap and a negative electrode strap arranged above each assembly element to be protruded upward from the opening of said container, said positive electrode strap connecting said positive electrode plates with each other and said negative electrode strap connecting said negative electrode plates with each other;

a positive electrode terminal and a negative electrode terminal respectively connected to said positive electrode strap and said negative electrode strap of each cell compartment, said positive electrode terminal and said negative electrode terminal being protruded above said cover, wherein said container further comprises ribs formed inside a bottom surface thereof for enabling said assembly elements to rest on said ribs, each positive electrode plate having a pair of feet that are formed on a lower end thereof in a substantially symmetrical arrangement and further comprising a lug connected to said positive electrode strap that is disposed at a position shifting either to the left or to the right, one of said feet corresponding to the position having said lug not resting on any rib, while the other foot rests on a rib.

2. A sealed lead acid storage battery in accordance with claim 1, wherein each negative electrode plate has a pair of feet that are formed in a substantially symmetrical arrangement and deviated from the pair of feet of said positive electrode plate, the pair of feet of said negative electrode plate resting on said ribs of said container.

3. A sealed lead acid storage battery in accordance with claim 1, wherein said container has four ribs in each cell compartment, one of said ribs not holding any foot of said plates.

4. A sealed lead acid storage battery comprising:

a monoblock container, in which at least two cell rows, each cell row including a plurality of cell compartments linked in a predetermined direction, are arranged adjacent to and in parallel to each other, each cell compartment being separated by first partitions;

a cover having second partitions that correspond to said first partitions of said monoblock container for separating the respective cell compartments;

plural assembly elements, each assembly element comprising a plurality of positive electrode plates and negative electrode plates that are stacked via separators in the predetermined directions, along which the cells of each cell row are linked with one another, and accommodated in each cell compartment;

a positive electrode strap and a negative electrode strap arranged above each assembly element to be protruded upward from the opening of said container, said positive electrode strap connecting said positive electrode plates with each other and said negative electrode strap connecting said negative electrode plates with each other;

a positive electrode terminal and a negative electrode terminal respectively connected to said positive electrode strap and said negative electrode strap of each cell compartment, said positive electrode terminal and said negative electrode terminal being protruded above said cover, wherein said storage battery further comprises a projection formed on an end face of the opening of one of said container and said cover and a recess formed in an end face of the opening of the other, said projection being fitted in said recess and bonded thereto via an adhesive, at least either an inner face of said recess or a surface of said projection having a plurality of vertical ribs for defining a space between the surface of said projection and the inner face of said recess.

5. A sealed lead acid storage battery in accordance with claim 4, wherein at least either the bottom surface of said recess or the free end of said projection has a plurality of ribs for restricting insertion of said projection into said recess.

* * * * *